(12) United States Patent
Iwamoto et al.

(10) Patent No.: US 8,603,565 B2
(45) Date of Patent: Dec. 10, 2013

(54) OIL-AND-FAT COMPOSITION AND PLASTIC OIL-AND-FAT COMPOSITION

(75) Inventors: Hide Iwamoto, Kanagawa (JP); Kiyomi Oonishi, Kanagawa (JP); Masataka Andou, Kanagawa (JP)

(73) Assignee: The Nisshin OilliO Group, Ltd., Tokyo (JP)

(*) Notice: Subject to any disclaimer, the term of this patent is extended or adjusted under 35 U.S.C. 154(b) by 114 days.

(21) Appl. No.: 12/737,913

(22) PCT Filed: Aug. 28, 2009

(86) PCT No.: PCT/JP2009/065077
§ 371 (c)(1),
(2), (4) Date: Feb. 28, 2011

(87) PCT Pub. No.: WO2010/026928
PCT Pub. Date: Mar. 11, 2010

(65) Prior Publication Data
US 2011/0151101 A1   Jun. 23, 2011

(30) Foreign Application Priority Data

Sep. 2, 2008 (JP) ................................. 2008-225141

(51) Int. Cl.
*A23D 9/00* (2006.01)
(52) U.S. Cl.
USPC ........................... 426/601; 426/606; 426/607
(58) Field of Classification Search
USPC .......................................... 426/601, 606, 607
See application file for complete search history.

(56) References Cited

U.S. PATENT DOCUMENTS

| | | | | |
|---|---|---|---|---|
| 4,610,889 | A * | 9/1986 | Schmidt | 426/602 |
| 5,431,948 | A | 7/1995 | Cain et al. | |
| 5,554,408 | A | 9/1996 | Cain et al. | |
| 5,601,860 | A * | 2/1997 | Lien et al. | 426/72 |
| 7,108,888 | B2 * | 9/2006 | Floeter | 426/603 |
| 7,927,647 | B2 * | 4/2011 | Andou et al. | 426/606 |

FOREIGN PATENT DOCUMENTS

| | | |
|---|---|---|
| EP | 0 786 209 A1 | 7/1997 |
| GB | 1 455 581 | 11/1976 |
| GB | 1 455 828 | 11/1976 |
| JP | 49-105806 A | 10/1974 |
| JP | 49-105807(A) | 10/1974 |
| JP | 55-153561 A | 11/1980 |
| JP | 62-81497 A | 4/1987 |
| JP | 9-143490(A) | 6/1997 |
| JP | 10-1691(A) | 1/1998 |
| JP | 10-95993(A) | 4/1998 |
| JP | 10-183165 A | 7/1998 |
| JP | 11-500318 T | 1/1999 |
| JP | 11-169191(A) | 6/1999 |
| JP | 2007-177100 A | 7/2007 |
| JP | 2009-232738 A | 10/2009 |
| WO | WO 96/39855 | 12/1996 |

OTHER PUBLICATIONS

Ong, A. 1982. Korean J. of Food Science & Technology 14(2)187.*
Lida, H. et al. 2002. JAOCS 79:1137.*
Bhatnagar, A. et al. 2009. JAOCS 86:991.*
Berger, K. 1981. Porim Technology 5. The Use of Palm OII Products in Margarines. Palm OII Research Institute of Malalysia, Kuala Lumpur, Malaysia, p. 1-7.*
Berger et al. 1981. Porim Technology 5:1.*
Chinese Office Action dated Jul. 9, 2012.
Notification and Information Statement dated Feb. 26, 2013 in Japanese Patent Application No. 2010-527772 (with partial English translation thereof).
Japanese Notification dated Aug. 14, 2013 and Information Statement dated Jul. 19, 2013 with partial translation.
Akio Kato (written and edited), "Use of Palm Oil and Palm Kernel Oil", p. 214, issued on Jul. 31, 1990, Saiwai Shobo (with partial English translation).
Satoshi Fujita, "Edible Fat and Oil-Food Fat and Oil and their Applications", p. 97, issued on Apr. 5, 2000, Saiwai Shobo (with partial English translation).
Japan oil Chemists' Society (edited), "The Handbook of Oil Chemistry, 2nd ed." , p. 35, issued on Nov. 30, 1971, Maruzen Company Limited (with partial English translation).

* cited by examiner

*Primary Examiner* — Carolyn Paden
(74) *Attorney, Agent, or Firm* — McGinn Intellectual Property Law Group, PLLC

(57) ABSTRACT

Disclosed is a plastic oil-and-fat composition which is suitable for use applications such as kneading, a spread, a coating cream, a sand cream or the like and contains a trans fatty acid at a low content. Also, disclosed is an oil-and-fat composition for use in the plastic oil-and-fat composition. The oil-and-fat composition comprises the oil-and-fats (A) and (B) shown below and meets the requirements (a) and (b) shown below. Oil-and-fat (A): an oil-and-fat containing a saturated fatty acid having 12 to 14 carbon atoms in an amount of 20 to 70 mass % relative to the total amount of all of the constituting fatty acids. Oil-and-fat (B): an oil-and-fat containing palmitic acid in an amount of 20 to 69.5 mass %, stearic acid in an amount of 0.5 to 6 mass % and oleic acid in an amount of 30 to 60 mass % all relative to the total amount of all of the constituting fatty acids. Requirement (a): The content of P2O in the oil-and-fat composition is 12 to 45 mass %. Requirement (b): The ratio of PPO to POP (PPO/POP) in the oil-and-fat composition is 0.15 to 1.00.

5 Claims, No Drawings

OIL-AND-FAT COMPOSITION AND PLASTIC OIL-AND-FAT COMPOSITION

TECHNICAL FIELD

The present invention relates to a plastic oil-and-fat composition suitable for use applications such as kneading, a spread, a coating cream, a sand cream or the like, and an oil-and-fat composition used for the plastic oil-and-fat composition.

In addition, the present invention relates to a food product such as a confectionery product, a bread, a coating cream, a sand cream or the like using the plastic oil-and-fat composition suitable for use applications such as kneading, a spread, a coating cream, a sand cream or the like.

BACKGROUND ART

Since a plastic oil-and-fat composition has plasticity as a property thereof, it is suitable for use applications such as kneading, a spread, a coating cream, a sand cream or the like.

As a kind of the plastic oil-and-fat composition, margarine, fat spread and shortening are included.

Conventionally, as the plastic oil-and-fat composition, various partially hydrogenated oils are used due to the fact that they have good processing suitability. However, the partially hydrogenated oil contains trans fatty acid, and it is required to reduce the trans fatty acid content also in the plastic oil-and-fat composition due to the recent trans fatty acid problem.

A plastic oil-and-fat composition for kneading is used for producing a dough of a confectionery product and a bread. The plastic oil-and-fat composition for kneading is kneaded in the dough of the confectionery product and the bread by that it is compounded and mixed in the dough. Due to this, it is needed for the plastic oil-and-fat composition for kneading to be easily kneaded in the dough in terms of workability.

In addition, in case that the plastic oil-and-fat composition is kneaded in a dough of a cake, the whipped one is mixed with wheat flour. Due to this, it is needed for the plastic oil-and-fat composition for kneading to have good whipping property (good creaming property).

Further, at the time of using the plastic oil-and-fat composition for kneading, there is a case that refrigerated one is taken out and then it is used, and sometimes it may be used just after it is taken out. Due to this, it is preferable that the plastic oil-and-fat composition for kneading is not hardened too much even if it is preserved at a low temperature, and has good plasticity even in a low temperature region.

The plastic oil-and-fat composition for a spread is mainly used as a food to be eaten in a manner such that it is spread on a bread or the like, and includes table margarine as the typical example.

Usually, at the time of using the plastic oil-and-fat composition for a spread, there is a case that refrigerated one is taken out and then it is used, and sometimes it may be used just after it is taken out. Due to this, it is needed for the plastic oil-and-fat composition for a spread to be not hardened too much even if it is preserved at a low temperature, and has good plasticity even in a low temperature region.

In addition, the plastic oil-and-fat composition for a spread itself is eaten, so that meltability in the mouth becomes important. Due to this, it is needed for the plastic oil-and-fat composition for a spread to have good meltability in the mouth.

The plastic oil-and-fat composition for a coating cream is used in a manner such that creamy one obtained by that ingredients are mixed is coated on a confectionery product or the like. Due to this, it is needed for the plastic oil-and-fat composition for a coating cream to be easily hardened in terms of workability. However, in order to be easily hardened, if a relatively hard oil-and-fat is used, the cream loses smoothness and the surface thereof becomes rough, so that bad condition is provided. Consequently, it is needed for the plastic oil-and-fat composition for a coating cream to be easily hardened and to keep the cream condition good.

The plastic oil-and-fat composition for a sand cream is used in a manner such that creamy one obtained by that ingredients are mixed is sandwiched between biscuits or the like. Due to this, it is needed for the plastic oil-and-fat composition for a sand cream to have good binding property to a sandwiching member such as biscuit and good formability.

As a plastic oil-and-fat composition in which a trans fatty acid content is reduced, a margarine using an oil-and-fat obtained by that a mixture oil of an oil-and-fat of palm oil origin and an oil-and-fat containing a saturated fatty acid having 22 carbon atoms is transesterificated is proposed (for example, refer to Patent Literature 1). However, the plastic oil-and-fat composition is intended to be used for table margarine and kneading purpose, and is not intended to be used for a coating cream and sand cream purpose.

Therefore, it is required to provide a plastic oil-and-fat composition that has a low trans fatty acid content and is suitable for use applications such as kneading, a spread, a coating cream, a sand cream or the like.

PRIOR ART DOCUMENTS

Patent Literature

Patent Literature 1: JP1987(S62)-A-81497

SUMMARY OF THE INVENTION

Problems to be Solved by the Invention

It is an object of the present invention to provide a plastic oil-and-fat composition that has a low trans fatty acid content and is suitable for use applications such as kneading, a spread, a coating cream, a sand cream or the like and an oil-and-fat used for the plastic oil-and-fat composition. In particular, with regard to the plastic oil-and-fat composition for kneading, it is an object to provide a composition for kneading that is easily kneaded in the dough, has good workability and has good whipping property and good plasticity in a low temperature region. In addition, with regard to the plastic oil-and-fat composition for a spread, it is an object to provide a composition that has good plasticity in a low temperature region and good meltability in the mouth. Also, with regard to the plastic oil-and-fat composition for a coating cream, it is an object to provide a composition that is easily hardened, has good workability and keeps the cream condition good. Further, with regard to the plastic oil-and-fat composition for a sand cream, it is an object to provide a composition that has good binding property to a sandwiching member such as biscuit and good formability.

In addition, it is an object of the present invention to provide a food product using the plastic oil-and-fat composition that has a low trans fatty acid content and is suitable for use applications such as kneading, a spread, a coating cream, a sand cream or the like.

Means for Solving the Problems

The inventors et al. have earnestly investigated to solve the above-mentioned problem, and as a result, have found that a plastic oil-and-fat composition using an oil-and-fat composition that includes the oil-and-fats (A) and (B) shown below and meeting the requirements (a) and (b) shown below is suitable for use applications such as kneading, a spread, a coating cream and a sand cream, so that the present invention has been completed.

Namely, a first invention according to the present invention is an oil-and-fat composition including the oil-and-fats (A) and (B) shown below and meeting the requirements (a) and (b) shown below.

Oil-and-fat (A): an oil-and-fat containing a saturated fatty acid having 12 to 14 carbon atoms in an amount of 20 to 70 mass % relative to the total amount of all of the constituting fatty acids Oil-and-fat (B): an oil-and-fat containing palmitic acid in an amount of 20 to 69.5 mass %, stearic acid in an amount of 0.5 to 6 mass % and oleic acid in an amount of 30 to 60 mass % all relative to the total amount of all of the constituting fatty acids Requirement (a): The content of P2O in the oil-and-fat composition is 12 to 45 mass % (the content of P2O: the total content of PPO and POP in the triacylglycerol; PPO: a triacylglycerol having palmitic acids as fatty acids of the first and second positions or the second and third positions, and oleic acid as a fatty acid of the third or first position; POP: a triacylglycerol having palmitic acids as fatty acids of the first and third positions, and oleic acid as a fatty acid of the second position; "P": palmitic acid; and "O": oleic acid)

Requirement (b): The ratio of PPO to POP (PPO/POP) in the oil-and-fat composition is 0.15 to 1.00

A second invention according to the present invention is the oil-and-fat composition described in the first invention, wherein the oil-and-fat (A) is one or not less than two selected from the group consisting of the transesterified oil (A) shown below and an oil-and-fat containing a saturated fatty acid having 12 to 14 carbon atoms in an amount of 50 to 70 mass % relative to the total amount of all of the constituting fatty acids:

Transesterified oil (A): an oil-and-fat containing a saturated fatty acid having 12 to 14 carbon atoms in an amount of 20 to 60 mass % and a saturated fatty acid having 16 to 18 carbon atoms in an amount of 40 to 80 mass % all relative to the total amount of all of the constituting fatty acids, and being obtained by that a transesterification is carried out.

A third invention according to the present invention is the oil-and-fat composition described in the first invention or the second invention, wherein the oil-and-fat (B) is one or not less than two selected from the group consisting of an oil-and-fat obtained by that palm olein having an iodine value of 50 to 65 is transesterified, palm mid-fraction having the iodine value of 43 to 48 and palm super olein having an iodine value of 55 to 70.

A fourth invention according to the present invention is a plastic oil-and-fat composition using the oil-and-fat composition described in any one of the first invention to the third invention.

A fifth invention according to the present invention is the plastic oil-and-fat composition described in the fourth invention, wherein the plastic oil-and-fat composition is a composition used for kneading, a spread, a coating cream or a sand cream purpose.

An sixth invention according to the present invention is a food product using the plastic oil-and-fat composition described in the fourth invention or the fifth invention.

Advantages of the Invention

According to the present invention, a plastic oil-and-fat composition that has a low trans fatty acid content and is suitable for use applications such as kneading, a spread, a coating cream, a sand cream or the like and an oil-and-fat used for the plastic oil-and-fat composition can be provided. In particular, with regard to the plastic oil-and-fat composition for kneading, a composition that is easily kneaded in the dough, has good workability and has good whipping property and good plasticity in a low temperature region can be provided. In addition, with regard to the plastic oil-and-fat composition for a spread, a composition that has good plasticity in a low temperature region and good meltability in the mouth can be provided. Also, with regard to the plastic oil-and-fat composition for a coating cream, a composition that is easily hardened, has good workability and keeps the cream condition good can be provided. Further, with regard to the plastic oil-and-fat composition for a sand cream, a composition that has good binding property to a sandwiching member such as biscuit and good formability can be provided.

In addition, a food product using the plastic oil-and-fat composition that has a low trans fatty acid content and is suitable for use applications such as kneading, a spread, a coating cream, a sand cream or the like can be provided.

EMBODIMENT FOR CARRYING OUT THE INVENTION

Hereinafter, the present invention will be explained in detail.

First, an oil-and-fat composition according to the present invention will be explained.

An oil-and-fat composition according to the present invention includes the oil-and-fats (A) and (B) shown below and meets the requirements (a) and (b) shown below:

Oil-and-fat (A): an oil-and-fat containing a saturated fatty acid having 12 to 14 carbon atoms in an amount of 20 to 70 mass % relative to the total amount of all of the constituting fatty acids Oil-and-fat (B): an oil-and-fat containing palmitic acid in an amount of 20 to 69.5 mass %, stearic acid in an amount of 0.5 to 6 mass % and oleic acid in an amount of 30 to 60 mass % all relative to the total amount of all of the constituting fatty acids Requirement (a): The content of P2O in the oil-and-fat composition is 12 to 45 mass % (the content of P2O: the total content of PPO and POP in all the triacylglycerol; PPO: a triacylglycerol having palmitic acids as fatty acids of the first and second positions or the second and third positions, and oleic acid as a fatty acid of the third or first position; POP: a triacylglycerol having palmitic acids as fatty acids of the first and third positions, and oleic acid as a fatty acid of the second position; "P": palmitic acid; and "O": oleic acid)

Requirement (b): The ratio of PPO to POP (PPO/POP) in the oil-and-fat composition is 0.15 to 1.00.

The oil-and-fat (A) used in the present invention is an oil-and-fat containing a saturated fatty acid having 12 to 14 carbon atoms in an amount of 20 to 70 mass %, preferably 25 to 70 mass %, more preferably 28 to 68 mass % relative to the total amount of all of the constituting fatty acids.

In case that a fatty acid content in the total constituting fatty acids of the oil-and-fat (A) is included in the above-mentioned range, the plastic oil-and-fat composition obtained becomes a composition having good meltability in the mouth.

Further, the fatty acid content in the oil-and-fat can be measured in accordance with AOCS Ce1f-96.

As the oil-and-fat (A), the transesterificated oil (A) shown below and an oil-and-fat containing a saturated fatty acid having 12 to 14 carbon atoms in an amount of 50 to 70 mass % relative to the total amount of all of the constituting fatty acids can be used.

The transesterified oil (A) is an oil-and-fat containing a saturated fatty acid having 12 to 14 carbon atoms in an amount of 20 to 60 mass %, preferably 25 to 40 mass %, more preferably 28 to 35 mass % and a saturated fatty acid having 16 to 18 carbon atoms in an amount of 40 to 80 mass %, preferably 46 to 70 mass %, more preferably 52 to 68 mass % all relative to the total amount of all of the constituting fatty acids. In addition, the transesterified oil (A) is an oil-and-fat obtained by that a transesterification is carried out.

In case that a fatty acid content in the total constituting fatty acids of the transesterified oil (A) is included in the above-mentioned range, the plastic oil-and-fat composition obtained becomes a composition having good meltability in the mouth. In addition, in case that the transesterified oil (A) is used, the plastic oil-and-fat composition obtained becomes a composition having good creaming property (good whipping property).

The transesterified oil (A) can be obtained by that, for example, a laurine-based oil-and-fat and a vegetable oil-and-fat that is fatty acid-rich having 16 to 18 carbon atoms are transesterificated and hydrogenated.

A laurine-based oil-and-fat in the present invention means an oil-and-fat that has a lauric acid content of not less than 30 mass % in the total constituting fatty acids, in particular, includes a coconut oil, a palm kernel oil, fractionated oils thereof and the like. The fractionated oil of the laurine-based oil-and-fat includes, as concrete examples, a palm kernel olein (a soft part obtained by fractionating a palm kernel oil), a palm kernel stearin (a hard part obtained by fractionating a palm kernel oil), a coconut stearin (a hard part obtained by fractionating a coconut oil) and the like. These laurine-based oil-and-fats can be used separately or in a mixture of not less than two oil-and-fats.

As the vegetable oil-and-fat that is fatty acid-rich having 16 to 18 carbon atoms in the present invention, a canola oil, a soybean oil, a palm-based oil-and-fat and the like can be exemplified, in particular, the palm-based oil-and-fat is preferable. These vegetable oil-and-fats that are fatty acid-rich having 16 to 18 carbon atoms can be used separately or in a mixture of not less than two oil-and-fats.

The palm-based oil-and-fat in the present invention means a palm oil and a fractionated oil of the palm oil. The fractionated oil of the palm oil includes, as concrete examples, a palm olein (a soft part obtained by fractionating a palm oil), a palm stearin (a hard part obtained by fractionating a palm oil), a palm super olein (a soft part obtained by further fractionating a palm olein and may be referred to as super olein), a palm top olein (a soft part obtained by further fractionating a palm super olein), a palm mid-fraction (a hard part obtained by further fractionating a palm olein and may be referred to as PMF), a soft palm (a soft part obtained by further fractionating a palm stearin), a hard stearin (a hard part obtained by further fractionating a palm stearin) and the like. These palm-based oil-and-fats can be used separately or in a mixture of not less than two oil-and-fats. Further, a method of fractionating the palm oil is not particularly limited, but any method of solvent fractionation, dry fractionation and surfactant fractionation can be selected.

Hydrogenation is not essential for preparing the transesterified oil (A), and it can be prepared only by transesterification in case that raw materials inherently having low iodine value are used. In addition, in case that both of transesterification and hydrogenation are carried out in the preparation of the transesterified oil (A), the order thereof is not particularly limited, but hydrogenation can be carried out after transesterification is carried out, and also transesterification can be carried out after hydrogenation is carried out.

In case that hydrogenation is not carried out in the preparation of the transesterified oil (A), the iodine value of transesterified oil (A) is preferably not more than 17, more preferably not more than 13 and most preferably 0 to 10.

In addition, in case that hydrogenation is carried out in the preparation of the transesterified oil (A), with a view to sufficiently reducing a trans fatty acid content, the iodine value of transesterified oil (A) is preferably not more than 10, more preferably not more than 5, furthermore preferably 0 to 2 and most preferably 0.

Further, the iodine value of oil-and-fat can be measured in accordance with a method of "Japan Oil Chemist's Society: The JOCS Standard Methods for the Analysis of Fats, Oils and Related Materials 2. 3. 4. 1-1996".

A method of the transesterification for preparing the transesterified oil (A) is not particularly limited, but it can be carried out by a usual method, and it can be carried out by any method of chemical transesterification using a synthesis catalyst and enzymatic transesterification using a lipase as a catalyst.

The chemical transesterification carries out the transesterification reaction by using a chemical catalyst such as sodium methoxide and the like as a catalyst. A transesterification reaction due to the chemical transesterification becomes a transesterification reaction that is poor in positional specificity (also referred to as a random transesterification).

The chemical transesterification reaction can be carried out, for example, in accordance with an ordinary method, by sufficiently drying raw material oil-and-fats, adding 0.1 to 1 mass % of catalyst to the raw material oil-and-fats, and then stirring under reduced pressure, at 80 to 120 degrees C., for 0.5 to 1 hour. After completion of the transesterification reaction, decolorization treatment and deodorization treatment that are performed in a usual refinement process of edible oil can be carried out after the catalyst is washed off with water.

The enzymatic transesterification carries out a transesterification reaction by using a lipase as a catalyst.

As the lipase, a powdery lipase and an immobilized lipase in which a powdery lipase is fixed in a carrier such as Celite (Registered trade mark), an ion exchange resin can be used. The transesterification reaction due to the enzymatic transesterification can be carried out by any reaction of a transesterification reaction that is poor in positional specificity and a transesterification reaction that is high in 1,3-positional specificity in accordance with types of lipase.

The lipase capable of carrying out the transesterification reaction that is poor in positional specificity includes a lipase originating in the genus Alcaligenes (for example, "Lipase QLM", "Lipase PL" and the like manufactured by Meito Sangyo Co., Ltd.), a lipase originating in the genus Candida (for example, "Lipase OF" manufactured by Meito Sangyo Co., Ltd.) and the like.

The lipase capable of carrying out the transesterification reaction that is high in 1,3-positional specificity includes an immobilized lipase originating in the Rhizomucor miehei ("Lipozyme RMIM" and the like manufactured by Novozymes A/S) and an immobilized lipase originating in the Thermomyces lanuginosa ("Lipozyme TLIM" and the like manufactured by Novozymes A/S) and the like.

The enzymatic transesterification reaction can be carried out, for example, by adding 0.02 to 10 mass %, preferably, 0.04 to 5 mass % of the powdery lipase or the immobilized lipase to the raw material oil-and-fats, and then stirring at 40 to 80 degrees C., preferably 40 to 70 degrees C., for 0.5 to 48 hours, preferably 0.5 to 24 hours. After completion of the transesterification reaction, decolorization treatment and deodorization treatment that are performed in a usual refinement process of edible oil can be carried out after the powdery lipase or the immobilized lipase is removed by filtration or the like.

In case that hydrogenation is carried out at the preparation of the transesterified oil (A), the method of hydrogenation is not particularly limited, but it can be carried out by a usual method. Hydrogenation can be carried out, for example, under the condition of hydrogen pressure of 0.02 to 0.3 MPa, temperature of 160 to 200 degrees C., in the presence of nickel catalyst.

As a preferred embodiment of the transesterified oil (A), an oil-and-fat obtained by transesterificating a mixture oil of a laurine based oil-and-fat and a palm based oil-and-fat and then hydrogenating to the extent that the iodine value becomes not more than 10 can be exemplified. In addition, an oil-and-fat obtained by hydrogenating each of the laurine based oil-and-fat and the palm based oil-and-fat separately to the extent that the iodine value becomes not more than 10, and then transesterificating a mixture oil thereof can be also exemplified. Here, it is preferable that a mixture ratio of the laurine based oil-and-fat and the palm based oil-and-fat is 30:70 to 70:30 by mass ratio of the laurine based oil-and-fat: the palm based oil-and-fat.

It is preferable that the hydrogenation is a fully hydrogenation (that means a hydrogenation that is carried out to the extent that the iodine value becomes 0 to 2).

The laurine-based oil-and-fat includes a palm kernel oil or a palm kernel olein as preferable examples. In addition, the palm-based oil-and-fat includes a palm oil, a palm stearin as preferable examples.

In case that the transesterified oil (A) is an oil-and-fat that is prepared by the above-mentioned combination, the plastic oil-and-fat composition obtained becomes a composition being easily hardened in case that it is used as a coating cream.

In addition, as a preferred embodiment of the transesterified oil (A), an oil-and-fat obtained by transesterificating a mixture oil of a laurine based oil-and-fat having an iodine value of not more than 10 and a palm based oil-and-fat having an iodine value of not more than 20 can be exemplified. Here, it is preferable that a mixture ratio of the laurine based oil-and-fat having an iodine value of not more than 10 and the palm based oil-and-fat having an iodine value of not more than 20 is 30:70 to 70:30 by mass ratio of the laurine based oil-and-fat:the palm based oil-and-fat.

The laurine-based oil-and-fat having an iodine value of not more than 10 includes a palm kernel stearin or a coconut stearin as preferable examples. The palm kernel stearin has an iodine value of preferably not more than 10, more preferable not more than 7. The palm-based oil-and-fat having an iodine value of not more than 20 includes a hard stearin. The hard stearin has an iodine value of preferably not more than 20, more preferably not more than 16, the most preferably not more than 13.

In case that the transesterified oil (A) is an oil-and-fat that is prepared by the above-mentioned combination, the plastic oil-and-fat composition obtained becomes a composition being easily hardened in case that it is used as a coating cream.

With regard to the oil-and-fat containing a saturated fatty acid having 12 to 14 carbon atoms in an amount of 50 to 70 mass %, it is preferable that the content of saturated fatty acid having 12 to 14 carbon atoms is 60 to 70 mass %, and it is more preferable that the content of saturated fatty acid having 12 to 14 carbon atoms is 63 to 68 mass %.

In case that the oil-and-fat containing a saturated fatty acid having 12 to 14 carbon atoms in an amount of 50 to 70 mass % is used, the plastic oil-and-fat composition obtained becomes a composition having good meltability in the mouth.

The oil-and-fat containing a saturated fatty acid having 12 to 14 carbon atoms in an amount of 50 to 70 mass % includes, for example, a laurine-based oil-and-fat such as a coconut oil, a palm kernel oil and the like. In addition, as the oil-and-fat containing a saturated fatty acid having 12 to 14 carbon atoms in an amount of 50 to 70 mass %, a fully hydrogenated oil, a fractionated oil and a transesterificated oil that are obtained by that a coconut oil or a palm kernel oil is processed can be also used.

As the oil-and-fat (A), one oil or a mixture oil of not less than two, of the transesterified oil (A) and the oil-and-fat containing a saturated fatty acid having 12 to 14 carbon atoms in an amount of 50 to 70 mass % can be used.

The content of oil-and-fat (A) in the oil-and-fat composition according to the present invention is 0.1 to 60 mass %, preferably 0.5 to 50 mass %, more preferably 1 to 30 mass %, furthermore preferably 1 to 25 mass %.

In case that the content of oil-and-fat (A) in the oil-and-fat composition is included in the above-mentioned range, the plastic oil-and-fat composition obtained becomes a composition having good meltability in the mouth.

The oil-and-fat (B) used in the present invention is an oil-and-fat which contains palmitic acid, stearic acid and oleic acid in the total constituting fatty acids thereof.

The content of palmitic acid in the total constituting fatty acids of the oil-and-fat (B) is 20 to 69.5 mass %, preferably 25 to 55 mass %, more preferably 30 to 50 mass %. In addition, the content of stearic acid in the total constituting fatty acids of the oil-and-fat (B) is 0.5 to 6 mass %, preferably 3 to 6 mass %, more preferably 3 to 5 mass %. In addition, the content of oleic acid in the total constituting fatty acids of the oil-and-fat (B) is 30 to 60 mass %, preferably 35 to 55 mass %, more preferably 37 to 50 mass %.

In case that the content of fatty acids in the total constituting fatty acids of the oil-and-fat (B) is included in the above-mentioned range, the plastic oil-and-fat composition obtained becomes a composition having good creaming property.

The oil-and-fat (B) can be obtained, for example, by using a palm oil or a fractionated oil of the palm oil such as a palm olein, a palm super olein, a palm top olein, a palm mid-fraction as a raw material oil-and-fat. The palm olein has an iodine value of preferably 50 to 65, more preferably 54 to 60. The palm super olein has an iodine value of preferably 55 to 70, more preferably 58 to 70. The palm top olein has an iodine value of preferably 60 to 75, more preferably 65 to 75. The palm mid-fraction has an iodine value of preferably 43 to 48.

In addition, the oil-and-fat (B) can be obtained, for example, by using an oil-and-fat obtained by transesterificating the palm olein, the palm super olein or a palm top olein as a raw material oil-and-fat. The palm olein to be transesterificated has an iodine value of preferably 50 to 65, more preferably 54 to 60. The super palm olein to be transesterificated has an iodine value of preferably 55 to 70, more preferably 58 to 70. The palm top olein to be transesterificated has an iodine value of preferably 60 to 75, more preferably 65 to 75.

A method of preparing a fractionated oil of a palm oil used for a raw material oil-and-fat of the oil-and-fat (B) is not particularly limited, but any method of solvent fractionation, dry fractionation and surfactant fractionation can be selected.

The transesterification for preparing the oil-and-fat (B) can be carried out due to the same method and condition as that used in the case of the transesterified oil (A).

The oil-and-fat (B) can be also prepared by using the above-mentioned raw material oil-and-fats separately or in a mixture of not less than two oil-and-fats.

As a preferred embodiment of the oil-and-fat (B), a mixture oil of an oil-and-fat obtained by transesterificating a palm olein having an iodine value of 50 to 65 and a palm super olein having an iodine value of 55 to 70, a mixture oil of an oil-and-fat obtained by transesterificating a palm olein having an iodine value of 50 to 65, a palm mid-fraction having an iodine value of 43 to 48 and a palm super olein having an iodine value of 55 to 70, a mixture oil of an oil-and-fat obtained by transesterificating a palm olein having an iodine value of 50 to 65, a palm olein having an iodine value of 50 to 65 and a palm super olein having an iodine value of 55 to 70, a mixture oil of an oil-and-fat obtained by transesterificating a palm olein having an iodine value of 50 to 65, a palm mid-fraction having an iodine value of 43 to 48, a palm olein having an iodine value of 50 to 65 and a palm super olein having an iodine value of 55 to 70 and the like can be exemplified.

In case that the oil-and-fat (B) is an oil-and-fat that is prepared by the above-mentioned combination, the plastic oil-and-fat composition obtained becomes a composition having good creaming property.

In case that the oil-and-fat (B) is the mixture oil of an oil-and-fat obtained by transesterificating a palm olein having an iodine value of 50 to 65 and a palm super olein having an iodine value of 55 to 70, the mixture ratio is preferably 1:0.1 to 1:5 by mass ratio, more preferably 1:1 to 1:4 by mass ratio of the oil-and-fat obtained by transesterificating a palm olein having an iodine value of 50 to 65: the palm super olein having an iodine value of 55 to 70.

In case that the oil-and-fat (B) is the mixture oil of the an oil-and-fat obtained by transesterificating a palm olein having an iodine value of 50 to 65, the palm mid-fraction having an iodine value of 43 to 48 and the palm super olein having an iodine value of 55 to 70, the mixture ratio is preferably 1:0.1:0.1 to 1:5:5 by mass ratio, more preferably 1:0.3:0.3 to 1:3:3 by mass ratio of the oil-and-fat obtained by transesterificating the palm olein having an iodine value of 50 to 65: the palm mid-fraction having an iodine value of 43 to 48: the palm super olein having an iodine value of 55 to 70.

In case that the oil-and-fat (B) is the mixture oil of the an oil-and-fat obtained by transesterificating a palm olein having an iodine value of 50 to 65, the palm olein having an iodine value of 50 to 65 and the palm super olein having an iodine value of 55 to 70, the mixture ratio is preferably 1:0.035:0.065 to 1:1.75:3.25 by mass ratio, more preferably 1:0.35:0.65 to 1:1.4:2.6 by mass ratio of the oil-and-fat obtained by transesterificating the palm olein having an iodine value of 50 to 65: the palm olein having an iodine value of 50 to 65: the palm super olein having an iodine value of 55 to 70.

In case that the oil-and-fat (B) is the mixture oil of the an oil-and-fat obtained by transesterificating a palm olein having an iodine value of 50 to 65, the palm mid-fraction having an iodine value of 43 to 48, the palm olein having an iodine value of 50 to 65 and the palm super olein having an iodine value of 55 to 70, the mixture ratio is preferably 1:0.1:0.018:0.033 to 1:5:1.75:3.25 by mass ratio, more preferably 1:0.3:0.035: 0.065 to 1:3:1.05:1.95 by mass ratio of the oil-and-fat obtained by transesterificating the palm olein having an iodine value of 50 to 65: the palm mid-fraction having an iodine value of 43 to 48: the palm olein having an iodine value of 50 to 65: the palm super olein having an iodine value of 55 to 70.

In case that the oil-and-fat (B) is an oil-and-fat that is prepared by the above-mentioned combination, the plastic oil-and-fat composition obtained becomes a composition having good creaming property.

The content of oil-and-fat (B) in the oil-and-fat composition according to the present invention is 5 to 95 mass %, preferably 20 to 95 mass %, more preferably 40 to 95 mass %, furthermore preferably 50 to 95 mass %.

In case that the content of oil-and-fat (B) in the oil-and-fat composition is included in the above-mentioned range, the plastic oil-and-fat composition obtained becomes a composition having good creaming property.

In the present invention, the oil-and-fat (B) is mainly used for adjusting the content of P2O and the ratio of PPO to POP (PPO/POP) that are described below.

A ratio of the content of oil-and-fat (B) to the content of oil-and-fat (A) (oil-and-fat (B)/oil-and-fat (A)) in the oil-and-fat composition according to the present invention is preferably 0.5 to 30, more preferably 1 to 30, further more preferably 1.5 to 25, most preferably 2 to 20.

In case that the ratio of the content of the oil-and-fat (B) to the content of the oil-and-fat (A) is included in the above-mentioned range, the plastic oil-and-fat composition obtained becomes a composition having good creaming property and good plasticity in a low temperature region.

The content of P2O in the oil-and-fat composition according to the present invention (requirement (a)) is 12 to 45 mass %, preferably 12 to 40 mass % and more preferably 12 to 30 mass %. The content of P2O in the present invention means the total content of PPO and POP in all the triacylglycerol existing in the oil-and-fat composition.

Further, in the present invention, "P" means palmitic acid and "O" means oleic acid, furthermore, PPO means a triacylglycerol having palmitic acids as fatty acids of the first and second positions or the second and third positions, and oleic acid as a fatty acid of the third or first position. In addition, POP means a triacylglycerol having palmitic acids as fatty acids of the first and third positions, and oleic acid as a fatty acid of the second position.

In case that the content of P2O in the oil-and-fat composition is included in the above-mentioned range, the plastic oil-and-fat composition obtained becomes a composition having good binding property when it is used as a sand cream.

The PPO/POP in the oil-and-fat composition according to the present invention (requirement (b)) is 0.15 to 1.00, preferably 0.20 to 0.80, more preferably 0.30 to 0.70 and furthermore preferably 0.40 to 0.65. The PPO/POP in the present invention means a ratio of the PPO content in all the triacylglycerol existing in the oil-and-fat composition to the POP content in all the triacylglycerol existing in the oil-and-fat composition.

Further, "P", "O", PPO and POP in the present invention are as described above.

In case that the PPO/POP in the oil-and-fat composition is included in the above-mentioned range, the plastic oil-and-fat composition obtained becomes a composition having good plasticity in a low temperature region.

The POP content and the PPO content in all the triacylglycerol existing in the oil-and-fat composition can be measured by combining an analysis of the total amount of POP content and PPO content according to a gas chromatography method in reference to JAOCS. Vol. 70, 11, 1111-1114 (1993) and an analysis of the composition ratio of POP content and PPO content according to a silver ion column-high-performance liquid chromatography in reference to J. High Resol. Chromatogr., 18, 105-107 (1995).

It is preferable that the oil-and-fat composition according to the present invention substantively contains no trans fatty acid. In the present invention, the "substantively containing no trans fatty acid" means that the trans fatty acid content in the total constituting fatty acids constituting the oil-and-fat composition is preferably less than 10 mass %, more preferably less than 5 mass %, furthermore preferably less than 2 mass %.

Further, the trans fatty acid content in the oil-and-fat composition can be measured in accordance with AOCS Ce1f-96.

The oil-and-fat composition according to the present invention can also include other oil-and-fats except for the above-mentioned oil-and-fat (A) and oil-and-fat (B) within a scope of not damaging an effect and advantage of the present invention. The content of other oil-and-fats is preferably not more than 70 mass %, more preferably not more than 65 mass %, furthermore preferably not more than 50 mass %, moreover preferably not more than 39 mass %, most preferably 0 mass % (includes only the oil-and-fat (A) and oil-and-fat (B)). The other oil-and-fats include, for example, a liquid oil, a milk fat and the like. The liquid oil in the present invention means an oil-and-fat having flowability at 20 degrees C. (preferably, an oil-and-fat having flowability at 5 degrees C., more preferably, an oil-and-fat having flowability and transparency at 5 degrees C.). The liquid oil includes a liquid vegetable oil such as a soybean oil, a canola oil, a corn oil, a sunflower oil, a safflower oil, a sesame oil, a cotton seed oil, a rice oil, an olive oil, a peanut oil, a linseed oil, an oil-and-fat containing triacylglycerol that includes medium chain fatty acids as the constituting fatty acids and the like.

The oil-and-fat composition according to the present invention can be manufactured by homogeneously mixing the above-mentioned oil-and-fat (A) and oil-and-fat (B), after melting the oil-and-fats by heat as needed. Further, for example, in case of the oil-and-fat composition including two of the oil-and-fat (A) (referred to as oil-and-fat (A1), oil-and-fat (A2)) and two of the oil-and-fat (B) (referred to as oil-and-fat (B1), oil-and-fat (B2)), the oil-and-fat composition can be also manufactured by mixing the oil-and-fat (A1), oil-and-fat (A2), oil-and-fat (B1) and oil-and-fat (B2) all at one time.

The oil-and-fat composition according to the present invention can be appropriately used for a plastic oil-and-fat composition for kneading, a spread, a coating cream, a sand cream or the like.

Next, the plastic oil-and-fat composition according to the present invention will be explained.

The plastic oil-and-fat composition according to the present invention is characterized in using the oil-and-fat composition according to the present invention. Further, "the plastic oil-and-fat composition according to the present invention using the oil-and-fat composition according to the present invention" means a plastic oil-and-fat composition that includes a plastic oil-and-fat composition prepared by separately mixing the above-mentioned oil-and-fat (A) and oil-and-fat (B) constituting the oil-and-fat composition according to the present invention in an oil phase so as to meet the above-mentioned requirements (a) and (b), other than a plastic oil-and-fat composition prepared by mixing the oil-and-fat composition according to the present invention in the oil phase.

The plastic oil-and-fat composition according to the present invention contains the oil-and-fat composition according to the present invention as an oil-and-fat component in an oil phase.

The content of the oil-and-fat composition according to the present invention in the total amount of the oil-and-fat components contained in the oil phase of the plastic oil-and-fat composition can be defined by the total content of the above-mentioned oil-and-fat (A) and oil-and-fat (B), and is preferably 30 to 100 mass %, more preferably 35 to 100 mass %, furthermore preferably 50 to 100 mass %, moreover preferably 61 to 100 mass %, most preferably 100 mass % (the oil-and-fat components in the oil phase are composed of only the oil-and-fat (A) and oil-and-fat (B)).

In addition, the plastic oil-and-fat composition according to the present invention is broadly divided into two types, namely, one that has a water phase and another that does not have the water phase. The plastic oil-and-fat composition having the water phase includes a water-in-oil type emulsion, an oil-in-water type emulsion, a double emulsion type emulsion, as an embodiment thereof, and the water-in-oil type emulsion is preferable. The plastic oil-and-fat composition involved in a type of the water-in-oil type emulsion includes a margarine, a fat spread.

In case that the plastic oil-and-fat composition is the water-in-oil type emulsion, the oil-in-water type emulsion and the double emulsion type emulsion, the content of the oil phase is preferably 48 to 98 mass %, more preferably 60 to 98 mass %, and the content of the water phase is preferably 2 to 52 mass %, more preferably 2 to 40 mass %.

The oil-and-fat component (the oil-and-fat composition according to the present invention including the above-mentioned oil-and-fat (A) and oil-and-fat (B)), a butter, an emulsifier, a perfume and the like are mixed in the oil phase. Water, a dietary salt, a powdered skim milk, a taste component and the like are mixed in the water phase.

In case that the content of the oil phase and the water phase of the plastic oil-and-fat composition is included in the above-mentioned range, the plastic oil-and-fat composition obtained becomes a composition having good plasticity in a low temperature region.

The plastic oil-and-fat composition that does not have the water phase includes a shortening as an embodiment thereof. In case that the plastic oil-and-fat composition is the shortening, the content of the oil phase becomes 100 mass %. The oil-and-fat component (the oil-and-fat composition according to the present invention including the above-mentioned oil-and-fat (A) and oil-and-fat (B)), an emulsifier and the like are mixed in the shortening.

Other oil-and-fats except for the above-mentioned oil-and-fat (A) and oil-and-fat (B) constituting the oil-and-fat composition according to the present invention can be also included in the oil phase of the plastic oil-and-fat composition as the oil-and-fat component within a scope of not damaging an effect and advantage of the present invention. The content of the other oil-and-fats in the total oil-and-fat components contained in the oil phase of the plastic oil-and-fat composition is preferably not more than 70 mass %, more preferably not more than 65 mass %, furthermore preferably not more than 50 mass %, moreover preferably not more than 39 mass %, most preferably 0 mass % (the oil-and-fat components in the oil phase are composed of only the oil-and-fat (A) and oil-and-fat (B)). The other oil-and-fats include, for example, a milk fat, a liquid oil and the like. The liquid oil is an oil as described above.

An emulsifier can be mixed in the plastic oil-and-fat composition. The emulsifier includes a synthetic emulsifier such as polyglyceryl fatty acid ester, sucrose fatty acid ester, sorbitan fatty acid ester, polysorbate, condensed ricinoleic fatty acid ester, glycerin fatty acid ester, and an emulsifier other than the synthetic emulsifier such as soybean lecithin, egg-yolk lecithin, soybean lysolecithin, egg yolk lysolecithin, enzyme-treated egg yolk, saponin, phytosterol group, a milk fat globule membrane and the like. The content of the emulsifier in the plastic oil-and-fat composition is preferably 0.01 to 5 mass %, more preferably 0.05 to 2 mass %, furthermore preferably 0.1 to 1 mass %.

The plastic oil-and-fat composition can include components that are usually mixed to the plastic oil-and-fat composition as the other components. The other components include food materials and food additives, for example, a thickener stabilizer; a salty taste enhancing agent such as dietary salt, potassium chloride; an acidifier such as acetic acid, lactic acid, gluconic acid; a sweetener such as a sugar group or a sugar alcohol group, stevia, aspartame; a colorant such as β-carotene, caramel, a pigment originating in red koji mold; an antioxidant such as tocopherol, a tea extract (such as catechin), rutin; a vegetable protein such as wheat protein, soybean protein; egg and various processed egg product; a perfume: a milk product such as a whole powdered milk, a powdered skim milk, a milk serum protein; a seasoning; a pH adjuster; a food preservative; a fruit; a fruit juice; coffee; nuts paste; a spice; cocoa mass; cocoa powder; cereal; pulse; vegetables; meat; fish and seafood.

The above-mentioned thickener stabilizer includes guar gum, locust bean gum, carrageenan, gum Arabic, an alginic acid group, pectine, xanthane gum, pullulan, tamarind seed gum, psyllium seed gum, crystal cellulose, carboxymethyl cellulose, methyl cellulose, agar, glucomannan, gelatin, starch, processed starch and the like.

The content of the other component in the plastic oil-and-fat composition according to the present invention is preferably not more than 10 mass %, more preferably not more than 5 mass %.

A method of manufacturing the plastic oil-and-fat composition according to the present invention is not particularly limited, but it can be manufactured by a heretofore known method.

In particular, it can be manufactured by first, melting an oil phase containing the oil-and-fat composition according to the present invention, after mixing and emulsifying a water phase as needed, and cooling and crystallizing it. It is preferable that the cooling and crystallization is carried out so as to allow it to be cooled and plasticized.

The cooling condition is preferably not less than −0.5 degrees C./min, more preferably not less than −5 degrees C./min. In this case, a rapid cooling is more preferable than a slow cooling.

A cooling machine includes a sealed continuous tube chilling machine, for example, a margarine manufacturing machine such as Votator, Combinator, Perfector and a plate type heat exchanger. In addition, the cooling machine can also include a combination of an open type Diacooler and Complecter.

In addition, it is preferable that a sterilization treatment is carried out after the melting of the oil phase or the mixing emulsification. As the sterilization method, any of a batch type using a tank and a continuous type using a plate type heat exchanger or a scraping type heat exchanger can be adopted.

Further, in the plastic oil-and-fat composition according to the present invention, the above-mentioned oil-and-fat (A) and oil-and-fat (B) constituting the oil-and-fat composition can be mixed in the oil phase separately so as to meet the above-mentioned requirements (a) and (b).

It is preferable that the plastic oil-and-fat composition according to the present invention substantively contains no trans fatty acid. In the present invention, the "substantively containing no trans fatty acid" means that the trans fatty acid content in the total constituting fatty acids in the plastic oil-and-fat composition is preferably less than 10 mass %, more preferably less than 5 mass %, furthermore preferably less than 2 mass %.

The plastic oil-and-fat composition according to the present invention can be used for a plastic oil-and-fat composition for kneading, a spread, a coating cream, a sand cream or the like.

The plastic oil-and-fat composition for kneading according to the present invention can be appropriately used for producing a confectionery and a bread. The plastic oil-and-fat composition for kneading according to the present invention is a composition that is easily kneaded in the dough, and has good whipping property (good creaming property) and good plasticity.

The plastic oil-and-fat composition for a spread according to the present invention can be used as a spread and a filling material. The plastic oil-and-fat composition for a spread according to the present invention has good plasticity and good meltability in the mouth.

The plastic oil-and-fat composition for a coating cream according to the present invention can be used as a coating cream that is used for being coated on a bread, a confectionery product, a cake or the like. The plastic oil-and-fat composition for a coating cream according to the present invention is a composition that is easily hardened, has good workability and keeps the cream condition good.

The plastic oil-and-fat composition for a sand cream according to the present invention can be used as a sand cream that is used for being sandwiched in a bread, a confectionery product, a cake or the like. The plastic oil-and-fat composition for a sand cream according to the present invention is a composition that has good binding property to a sandwiching member such as biscuit and good formability.

Next, a food product according to the present invention will be explained.

The food product according to the present invention is characterized in using the plastic oil-and-fat composition according to the present invention.

The food product according to the present invention includes a confectionery, a bread, a spread, a filling material, a coating cream, a sand cream and the like.

Further, a mixture ratio of the plastic oil-and-fat composition according to the present invention to the food product according to the present invention is varied in accordance with a kind of the food product for which it is used, so that the mixture ratio is not particularly limited.

In addition, a method of manufacturing the food product according to the present invention is not particularly limited, but it can be manufactured by using a heretofore known raw material, mixing composition and method, other than using the plastic oil-and-fat composition according to the present invention.

The plastic oil-and-fat composition for kneading according to the present invention can be appropriately used for a confectionery and a bread.

The confectionery and bread are produced, for example, by that the plastic oil-and-fat composition for kneading is kneaded in a dough by a usual method, and then the dough is baked. The plastic oil-and-fat composition for kneading according to the present invention is a composition that is easily kneaded in the dough, and has good whipping property (good creaming property) and good plasticity, so that when a confectionery or a bread is produced by using the plastic oil-and-fat composition for kneading according to the present invention, good workability at the time of production can be obtained.

The confectionery and bread produced by using the plastic oil-and-fat composition for kneading according to the present invention are not particularly limited, if they are a product in which a margarine, a fat spread or a shortening is mixed in the dough. The confectionery includes a cookie, a biscuit, a cake and the like as concrete examples.

The plastic oil-and-fat composition for a spread according to the present invention can be appropriately used for a spread and a filling material.

With regard to the spread and the filling material, the plastic oil-and-fat composition for a spread can be also used as the spread and the filling material without any change. In addition, the spread and the filling material can be prepared by mixing the plastic oil-and-fat composition for a spread and peanuts, chocolates and the like. The spread is used by being coated to a bread, a confectionery and the like. The food product according to the present invention also includes the bread, the confectionery and the like that are coated with the spread. The filling material is used by being sandwiched in a bread, a confectionery or the like. In addition, the food product according to the present invention also includes the bread, the confectionery and the like that sandwiches the filling material.

The spread and filling material of the present invention has good plasticity and good meltability in the mouth.

The plastic oil-and-fat composition for a coating cream according to the present invention can be appropriately used for a coating cream.

The coating cream is used for being coated on a bread, a confectionery product, a cake or the like, in particular, it includes a cream used in a cheese rice cracker and the like. The food product according to the present invention also includes a bread, a confectionery, a cake and the like that are coated with the coating cream.

With regard to the coating cream, the plastic oil-and-fat composition for a coating cream can be also used as the coating cream without any change. In addition, the coating cream can be also prepared by mixing a sugar and the like. As the coating cream, a cream that is prepared by being whipped can be also used.

The coating cream of the present invention is easily hardened, has good workability and keeps the cream condition good.

The plastic oil-and-fat composition for a sand cream according to the present invention can be appropriately used for a sand cream.

The sand cream is used for being sandwiched in a bread, a confectionery product, a cake or the like, in particular, it includes a biscuit, a cookie, a sable and the like. The food product according to the present invention also includes the biscuit, the cookie, the sable and the like in which the sand cream is sandwiched.

With regard to the sand cream, the plastic oil-and-fat composition for a sand cream can be also used as the sand cream without any change. In addition, the sand cream can be also prepared by mixing a sugar and the like. As the sand cream, a cream that is prepared by being whipped can be also used.

The sand cream of the present invention has good binding property to a sandwiching member such as biscuit and the like and good formability, so that when the sand cream of the present invention is used, workability at the time of producing the biscuit, the cookie, the sable or the like becomes good, and the biscuit, the cookie, the sable or the like obtained becomes one that is not easily separated.

EXAMPLES

Next, the present invention will be explained in detail by Examples and Comparative Examples. However, the present invention is not limited by Examples at all.

[Measurement Method]

Measurements of the following fatty acid content in an oil-and-fat, an iodine value of the oil-and-fat, a trans fatty acid content in the oil-and-fat, PPO content and POP content in the oil-and-fat were measured by the methods described below.

The fatty acid content in the oil-and-fat was measured in accordance with AOCS Ce1f-96.

The iodine value of the oil-and-fat was measured in accordance with a method of "Japan Oil Chemist's Society: The JOCS Standard Methods for the Analysis of Fats, Oils and Related Materials 2. 3. 4. 1-1996".

The trans fatty acid content in the oil-and-fat was measured in accordance with AOCS Ce1f-96.

The POP content and PPO content in all the triacylglycerol existing in the oil-and-fat were measured by combining an analysis of the total amount of the POP content and the PPO content according to a gas chromatography method in reference to JAOCS. Vol. 70, 11, 1111-1114 (1993) and an analysis of the composition ratio of the POP content and the PPO content according to a silver ion column-high-performance liquid chromatography in reference to J. High Resol. Chromatogr., 18, 105-107 (1995).

[Preparation of Oil-and-Fat (A1)]

After 10 kg of a palm stearin (an iodine value (IV): 33, manufactured in the Nissin OilliO Group, Ltd.) and 10 kg of a palm kernel olein (IV: 25, a lauric acid content: 41 mass %, manufactured in the Nissin OilliO Group, Ltd.) were mixed, and were dried by heat under reduced pressure at 115 to 120 degrees C., 20 g of sodium methoxide was added as a catalyst, and a transesterification reaction was conducted while stirring was carried out for 30 minutes under reduced pressure. After completion of the transesterification reaction, water washing and decolorization were carried out, and then a hydrogenation was carried out by using a nickel catalyst at 160 to 200 degrees C., and the iodine value was adjusted to be not more than 2. After confirming that the iodine value became not more than 2, a temperature was lowered to not more than 100 degrees C., the nickel catalyst was removed by filtration, and decolorization and deodorization were performed, so that the oil-and-fat (A1) (IV: 0.1, a content of saturated fatty acids having 12 to 14 carbon atoms: 31.0 mass %, a content of saturated fatty acids having 16 to 18 carbon atoms: 64.7 mass %) was obtained.

[Preparation of Oil-and-Fat (A2)]

After 10 kg of a coconut oil (IV: 8.6, trade name: Refined coconut oil, manufactured in the Nissin OilliO Group, Ltd.) were hydrogenated at 160 to 200 degrees C. by using a nickel catalyst, the iodine value was adjusted to become not more than 2. After confirming that the iodine value became not more than 2, a temperature was lowered to not more than 100 degrees C., the nickel catalyst was removed by filtration, and decolorization and deodorization were performed, so that the oil-and-fat (A2) (IV: 0.7, a content of saturated fatty acids having 12 to 14 carbon atoms: 65.2 mass %) was obtained.

[Oil-and-Fat (A3)]

As an oil-and-fat (A3), a coconut oil (IV: 8.6, a content of saturated fatty acids having 12 to 14 carbon atoms: 65.2 mass %, trade name: Refined coconut oil, manufactured in the Nissin OilliO Group, Ltd.) was used.

[Preparation of Oil-and-Fat (B1)]

20 kg of a soft part (a palm olein, IV: 56) which is obtained by that a palm oil (IV: 52, trade name: Refined palm oil, manufactured by the Nissin OilliO Group, Ltd.) was fractionated was dried at 115 to 120 degrees C. under reduced pressure, 20 g of sodium methoxide was added, and stirring was carried out for 30 minutes under reduced pressure, so that a transesterification reaction was conducted. After completion of the transesterification reaction, water washing, decolorization and deodorization were carried out, so that an oil-and-fat (B1) (IV: 56, a content of palmitic acid: 39.8 mass %, a content of stearic acid: 4.4 mass %, a content of oleic acid: 42.6 mass %, manufactured in the Nissin OilliO Group, Ltd.) was obtained.

[Preparation of Oil-and-Fat (B2)]

As an oil-and-fat (B2), a palm mid-fraction (IV: 45, a content of palmitic acid: 48.0 mass %, a content of stearic acid: 4.9 mass %, a content of oleic acid: 37.7 mass %, manufactured in the Nissin OilliO Group, Ltd.) was obtained, the palm mid-fraction being a hard part obtained by that a palm olein (IV: 56, manufactured by the Nissin OilliO Group, Ltd.) which is a soft part obtained by that a palm oil (IV: 52, trade name: Refined palm oil, manufactured by the Nissin OilliO Group, Ltd.) was fractionated was further fractionated.

[Oil-and-Fat (B3)]

As an oil-and-fat (B3), a palm oil (IV: 52, trade name: Refined palm oil, a content of palmitic acid: 43.8 mass %, a content of stearic acid: 4.4 mass %, a content of oleic acid: 39.7 mass %, manufactured by the Nissin OilliO Group, Ltd.) was used.

[Preparation of Oil-and-Fat (B4)]

A palm olein (IV: 56, manufactured by the Nissin OilliO Group, Ltd.) was obtained, the palm olein being a soft part obtained by that a palm oil (IV: 52, trade name: Refined palm oil, manufactured by the Nissin OilliO Group, Ltd.) was fractionated. A palm super olein (IV: 65, manufactured by the Nissin OilliO Group, Ltd.) was obtained, the palm super olein being a soft part obtained by that a palm olein (IV: 56, manufactured by the Nissin OilliO Group, Ltd.) which is a soft part obtained by that a palm oil (IV: 52, trade name: Refined palm oil, manufactured by the Nissin OilliO Group, Ltd.) was fractionated was further fractionated. The palm olein and the palm super olein obtained were mixed in the mass ratio of 35 to 65, so that an oil-and-fat (B4) (IV: 60, a content of palmitic acid: 36.7 mass %, a content of stearic acid: 4.0 mass %, a content of oleic acid: 45.5 mass %, manufactured by the Nissin OilliO Group, Ltd.) was obtained.

[Preparation of Oil-and-Fat (B5)]

As an oil-and-fat (B5), a palm super olein (IV: 65, a content of palmitic acid: 33.0 mass %, a content of stearic acid: 3.6 mass %, a content of oleic acid: 47.6 mass %, manufactured by the Nissin OilliO Group, Ltd.) was obtained, the palm super olein being a soft part obtained by that a palm olein (IV: 56, manufactured by the Nissin OilliO Group, Ltd.) which is a soft part obtained by that a palm oil (IV: 52, trade name: Refined palm oil, manufactured by the Nissin OilliO Group, Ltd.) was fractionated was further fractionated.

[Other Oil-and-Fats]

As other oil-and-fats, an extremely hardened oil of a palm oil (trade name: Palm extremely hardened oil, manufactured by Yokozeki Oil & Fat Industries Co., LTd.) was used as an oil-and-fat (C1) and a canola oil (trade name: Nissin refined canola oil, clarification of 0 degree C. and 5 hours, manufactured by the Nissin OilliO Group, Ltd.) was used as an oil-and-fat (C2).

[Mixing Composition of Oil-and-Fat Composition]

Oil-and-fat compositions 1 to 15 were mixed in a mixing composition shown in Table 1 (Example) and Table 2 (Comparative Example) described below. In addition, measurement results of the content of P2O and the ratio of PPO/POP in the oil-and-fat compositions 1 to 15 were shown in Table 1 (Example) and Table 2 (Comparative Example).

[Table 1]
[Table 2]

[Preparation of Margarine for Kneading]

An oil phase was prepared by that oil-and-fats being mixed into the oil-and-fat composition as constituents and an emulsifier were mixed in a mixing composition shown in Table 3 and Table 4 described below. Next, a water phase was prepared in mixing compositions shown in Table 3 and Table 4 described below, and a preliminary emulsification was carried out by that the oil phase and the water phase prepared were mixed in mixing ratios shown in Table 3 and Table 4. The preliminary emulsification product obtained was plasticized by rapid cooling by using an Onlator, so that margarines for kneading of Examples 1 to 4 and Comparative Examples 1 to 6 were obtained.

Further, all of the trans fatty acid contents in the margarines for kneading of Examples 1 to 4 and Comparative Examples 1 to 6 were less than 1 mass %.

By using the margarines for kneading of Examples 1 to 4 and Comparative Examples 1 to 6, kneading time, creaming property and low temperature usability were compared and evaluated due to the test methods described below. Further, the evaluation result of the low temperature usability was determined due to a comprehensive evaluation based on results of comparison and evaluation of 10 panelists. The result was shown in Table 3 and Table 4.

<Test Method of Kneading Time>

Strong flour (70 part by mass), raw yeast (2.6 part by mass) and water (40 part by mass) were mixed for 2 minutes at low speed and for 2 minutes at medium speed by using a mixer (Type: SK-20, manufactured by SK Mixer Co., Ltd.) (kneading temperature: 25 degrees C.), so that a dough was prepared. The dough was fermented at the temperature of 28 degrees C., in the humidity of 75%, for 2 hours. Strong flour (30 part by mass), superfine sugar (6 part by mass), dietary salt (1.7 part by mass), powdered skim milk (3 part by mass) and water (27 part by mass) were provided into the dough after fermented, and mixed for 2 minutes at low speed and for 5 minutes at medium speed, and then each of margarines for kneading (6 part by mass) was provided and mixed, and time until it was kneaded was measured and evaluation was carried out due to the evaluation criteria described below.

<Evaluation Criteria of Kneading Time>

◎: not more than 2 minutes
○: 2 minutes 1 second to 2 minutes 14 seconds
Δ: 2 minutes 15 seconds to 2 minutes 29 seconds
x: more than 2 minutes 30 seconds <Test Method of Creaming Property>

Each of margarines for kneading (500 g) was allowed to stand for not less than 3 hours in a constant temperature water tank of 20 degrees C. so that the temperature was adjusted. The margarine for kneading of which temperature was adjusted was put into a bowl and mixed for 15 minutes by a Hobart mixer (N-50, manufactured by HOBART JAPAN). The margarine for kneading to which mixing was carried out was filled in a cup so as not to feed air bubbles and the top portion of the margarine in the cup was flattened by a pallet knife, and then mass was measured and values obtained by the calculation formula described below was defined as (C·V). Evaluation was carried out by using the values (C·V) calculated due to the evaluation criteria described below.

$(C \cdot V)$ (mL/g)=volume of cup (mL)/mass of margarine for kneading in cup (g)

<Evaluation Criteria of Creaming Property>

◎: not less than 2.9
○: not less than 2.7, less than 2.9
Δ: not less than 2.4, less than 2.7
x: less than 2.4

<Test Method of Low Temperature Usability>

Ease of scooping the margarine for kneading by a paddle immediately after each of the margarines that had been preserved in a refrigerator was taken out from the refrigerator was tested and evaluated due to the evaluation criteria described below.

<Evaluation Criteria of Low Temperature Usability>
◎: extreme ease of scooping, good workability
○: ease of scooping, good workability
Δ: somewhat difficulty of scooping
x: extreme difficulty of scooping
[Table 3]
[Table 4]

As will be noted from Table 3, the margarines for kneading of Examples have short kneading time and are easily kneaded in the dough, so that they have excellent workability. In addition, the margarines for kneading of Examples have excellent creaming property and low temperature usability, and have good whipping property and good plasticity.

On the other hand, as will be noted from Table 4, in case of the margarines for kneading of Comparative Examples, there were no margarines that were satisfactory for all of the evaluation items.

[Preparation of Spread]

An oil phase was prepared by that oil-and-fats being mixed into the oil-and-fat composition as constituents and an emulsifier were mixed in a mixing composition shown in Table 5 and Table 6 described below. Next, a water phase was prepared in mixing compositions shown in Table 5 and Table 6, and a preliminary emulsification was carried out by that the oil phase and the water phase prepared were mixed in mixing ratios shown in Table 5 and Table 6. The preliminary emulsification product obtained was plasticized by rapid cooling by using an Onlator, so that spreads of Examples 5 to 7 and Comparative Examples 7 to 12 were obtained.

Further, all of the trans fatty acid contents in the spreads of Examples 5 to 7 and Comparative Examples 7 to 12 were less than 1 mass %.

By using the spreads of Examples 5 to 7 and Comparative Examples 7 to 12, meltability in the mouth when they are eaten was compared and evaluated due to the evaluation criteria described below. In addition, low temperature usability was compared and evaluated due to the test method described below. Further, the evaluation results of the meltability in the mouth and the low temperature usability were determined due to a comprehensive evaluation based on results of comparison and evaluation of 10 panelists. The results were shown in Table 5 and Table 6.

(Evaluation Criteria of Meltability in the Mouth)
◎: melt in the mouth at short times almost without resistance, good
○: melt in the mouth at short times, good
Δ: require some time for being melted in the mouth, somewhat no good
x: unmelted residue and stickiness in the mouth are recognized, no good <Test Method of Low Temperature Usability>

Each of the spreads that had been preserved in a refrigerator was taken out from the refrigerator, and ease of scooping the spread by a butter spoon immediately after the spread was taken out from the refrigerator was tested and evaluated due to the evaluation criteria described below.

<Evaluation Criteria of Low Temperature Usability>
◎: extreme ease of scooping, good workability
○: ease of scooping, good workability
Δ: somewhat difficulty of scooping
x: extreme difficulty of scooping
[Table 5]
[Table 6]

As will be noted from Table 5, the spreads of Examples have good meltability in the mouth. In addition, the spreads of Examples have excellent low temperature usability, and have good plasticity.

On the other hand, as will be noted from Table 6, in case of the spreads of Comparative Examples, there were no spreads that were satisfactory for both of the evaluation items.

[Preparation of Coating Cream]

Oil-and-fats that are mixed into the oil-and-fat composition as constituents and perfectly melted, powder sugar and cheese powder (trade name: QBB cheese powder SA, manufactured by Rokko Butter Co. Ltd.) were filled in a mixer bowl in a mixing composition shown in Table 7 and Table 8 described below, and mixed for 3 minutes by a Hobart mixer (N-50, manufactured by HOBART JAPAN), so that coating creams of Examples 8 to 11 and Comparative Examples 13 to 18 were obtained.

Further, all of the trans fatty acid contents in the coating creams of Examples 8 to 11 and Comparative Examples 13 to 18 were less than 1 mass %.

Solidification time was compared and evaluated by using the coating creams of Examples 8 to 11 and Comparative Examples 13 to 18 due to the test method described below. In addition, conditions of the creams were observed, and compared and evaluated due to the evaluation criteria described below. Further, the evaluation results of the conditions of the creams were determined due to a comprehensive evaluation based on results of comparison and evaluation of 10 panelists. The results were shown in Table 7 and Table 8.

<Test Method of Solidification Time>

After 15 g of the respective coating creams were dispensed to a Petri dish having diameter of 85 mm, time from the cream being allowed to stand at 20 degrees C. to the cream being solidified so that the cream had no stickiness to fingers was measured, and evaluated due to the evaluation criteria described below.

<Evaluation Criteria of Solidification Time>
◎: less than 14 minutes
○: not less than 14 minutes, less than 30 minutes
Δ: not less than 30 minutes, less than 45 minutes
x: not less than 45 minutes <Evaluation Criteria of Condition of Cream>
○: smooth and good
Δ: somewhat hard and being felt to be dried, or low in viscosity
x: hard and extremely being felt to be dried, low in viscosity and difficult in shape forming
[Table 7]
[Table 8]

As will be noted from Table 7, the coating creams of Examples have short solidification time, so that they have good workability. In addition, the coating creams of Examples keep the cream condition good.

On the other hand, as will be noted from Table 8, in case of the coating creams of Comparative Examples, there were no coating creams that were satisfactory for both of the evaluation items.

[Preparation of Sand Cream]

Oil-and-fats that are mixed into the oil-and-fat composition as constituents and perfectly melted and powder sugar were filled in a mixer bowl in a mixing composition shown in Table 9 and Table 10 described below, and mixed at a low speed (70 rpm) for 30 seconds by a Hobart mixer (N-50, manufactured by HOBART JAPAN). After the mixing at the low speed, a mixing was carried out at a medium speed (130 rpm) until specific gravity thereof became 0.80, so that sand creams of Examples 12 to 15 and Comparative Examples 19 to 24 were obtained.

Further, all of the trans fatty acid contents in the sand creams of Examples 12 to 15 and Comparative Examples 19 to 24 were less than 1 mass %.

Binding property and formability were compared and evaluated by using the sand creams of Examples 12 to 15 and Comparative Examples 19 to 24 due to the test method described below. Further, the evaluation results of the binding property and formability were determined due to a comprehensive evaluation based on results of comparison and evaluation of 10 panelists. The results were shown in Table 9 and Table 10.

<Test Method of Binding Property>

After 5 g of sand cream were sandwiched between biscuits having diameter of 45 mm and they were allowed to stand at room temperature, a degree of biscuits not being easily separated and adhering state of a sand cream to biscuits were evaluated due to the evaluation criteria described below.

<Evaluation Criteria of Binding Property>

⊚: having appropriate degree of not being easily separated and no adhering of cream to biscuits, good ○: having appropriate degree of not being easily separated and little adhering of cream to biscuits Δ: somewhat not being easily separated or somewhat being easily separated and somewhat much adhering of cream to biscuits x: extremely not being easily separated or extremely being easily separated and much adhering of cream to biscuits, no good <Test Method of Formability>

After 5 g of sand cream were sandwiched between biscuits having diameter of 45 mm and they were allowed to stand at room temperature for 5 minutes, a degree of the shape of cream not being easily lost when biscuits were pushed by fingers was evaluated due to the evaluation criteria described below.

<Evaluation Criteria of Formability>

⊚: extremely not being easily lost

○: somewhat not being easily lost

Δ: somewhat being easily lost x: extremely being easily lost

[Table 9]
[Table 10]

As will be noted from Table 9, the sand creams of Examples have excellent binding property and formability.

On the other hand, as will be noted from Table 10, in case of the sand creams of Comparative Examples, there were no sand creams that were satisfactory for both of the evaluation items.

[Preparation and Evaluation of Spread]

Spreads of Examples 16 to 17 were obtained in a mixing composition shown in Table 11 described below by the same method as the above-mentioned method used in Examples 5 to 7. Further, all of the trans fatty acid contents in the spread of Examples 16 to 17 were less than 1 mass %.

By using the spreads of Examples 16 to 17, meltability in the mouth when they are eaten and low temperature usability were evaluated by the same method as the above-mentioned method used in Examples 5 to 7. The results were shown in Table 11.

[Table 11]

As will be noted from Table 11, the spreads of Examples 16 to 17 have good meltability in the mouth. In addition, the spreads of Examples 16 to 17 have excellent low temperature usability and good plasticity.

[Preparation and Evaluation of Coating Cream]

A coating cream of Example 18 was obtained in a mixing composition shown in Table 12 described below by the same method as the above-mentioned method used in Examples 8 to 11. Further, all of the trans fatty acid contents in the coating cream of Example 18 was less than 1 mass %.

By using the coating cream of Example 18, solidification time and condition of cream were evaluated by the same method as the above-mentioned method used in Examples 8 to 11. The results were shown in Table 12.

[Table 12]

As will be noted from Table 12, the coating cream of Example 18 has short solidification time, so that it has good workability. In addition, the coating cream of Example 18 keeps the cream condition good.

TABLE 1

Mixing composition of OFC (unit: mass %), PPO/POP in OFC, content of P2O in OFC (unit: mass %) and trans fatty acid content (unit: mass %)

|  | OFC 1 | OFC 2 | OFC 3 | OFC 4 | OFC 5 | OFC 6 | OFC 13 | OFC 14 | OFC 15 |
|---|---|---|---|---|---|---|---|---|---|
| OF A1 | 10 | 5 | 0 | 10 | 23 | 20 | 7 | 9 | 10 |
| OF A2 | 0 | 0 | 10 | 0 | 0 | 0 | 0 | 0 | 0 |
| OF A3 | 17.5 | 0 | 0 | 0 | 0 | 0 | 0 | 0 | 0 |
| OF B1 | 29 | 45 | 42 | 25 | 43 | 40 | 13 | 17 | 50 |
| OF B2 | 0 | 20 | 18 | 0 | 29 | 30 | 8 | 12 | 40 |
| OF B3 | 0 | 0 | 0 | 0 | 0 | 0 | 30 | 20 | 0 |
| OF B4 | 0 | 0 | 0 | 40 | 5 | 10 | 3 | 4 | 0 |
| OF B5 | 43.5 | 30 | 30 | 0 | 0 | 0 | 0 | 0 | 0 |
| OF C1 | 0 | 0 | 0 | 0 | 0 | 0 | 0 | 0 | 0 |
| OF C2 | 0 | 0 | 0 | 25 | 0 | 0 | 39 | 38 | 0 |
| PPO/POP | 0.62 | 0.51 | 0.51 | 0.45 | 0.47 | 0.42 | 0.25 | 0.30 | 0.45 |
| P2O | 13.7 | 25.3 | 23.6 | 15.9 | 25.8 | 26.8 | 17.1 | 17.2 | 30.4 |
| Trans fatty acid | 0.1 | 0.1 | 0.1 | 0.1 | 0.1 | 0.1 | 0.1 | 0.1 | 0.1 |

OFC = Oil-and-Fat Composition
OF = Oil-and-Fat

TABLE 2

Mixing composition of OFC (unit: mass %), PPO/POP in OFC, content of P2O in OFC (unit: mass %) and trans fatty acid content (unit: mass %)

|  | OFC 7 | OFC 8 | OFC 9 | OFC 10 | OFC 11 | OFC 12 |
|---|---|---|---|---|---|---|
| OF A1 | 5 | 0 | 12 | 17 | 5 | 0 |
| OF A2 | 0 | 0 | 0 | 0 | 0 | 0 |
| OF A3 | 0 | 0 | 0 | 0 | 0 | 5 |
| OF B1 | 54 | 0 | 0 | 15 | 16 | 0 |
| OF B2 | 0 | 0 | 13 | 0 | 14 | 95 |
| OF B3 | 0 | 90 | 0 | 0 | 0 | 0 |
| OF B4 | 0 | 0 | 0 | 9 | 0 | 0 |
| OF B5 | 0 | 8 | 36 | 20 | 0 | 0 |
| OF C1 | 0 | 2 | 0 | 0 | 0 | 0 |
| OF C2 | 41 | 0 | 39 | 39 | 65 | 0 |
| PPO/POP | 2 | 0.11 | 0.11 | 0.48 | 0.42 | 0.11 |
| P2O | 12.6 | 29.2 | 11.7 | 8.9 | 10.7 | 47.5 |
| Trans fatty acid | 0.1 | 0.1 | 0.1 | 0.1 | 0.1 | 0.1 |

OFC = Oil-and-Fat Composition
OF = Oil-and-Fat

TABLE 3

Mixing composition of margarine for kneading (unit: part by mass) and evaluation result of margarine for kneading

| Margarine for kneading | | Ex. 1 | Ex. 2 | Ex. 3 | Ex. 4 |
|---|---|---|---|---|---|
| Oil phase | OFC 1 | 93.2 | 0 | 0 | 0 |
| | OFC 2 | 0 | 93.2 | 0 | 0 |
| | OFC 3 | 0 | 0 | 93.2 | 0 |
| | OFC 4 | 0 | 0 | 0 | 93.2 |
| | OFC 7 | 0 | 0 | 0 | 0 |
| | OFC 8 | 0 | 0 | 0 | 0 |
| | OFC 9 | 0 | 0 | 0 | 0 |
| | OFC 10 | 0 | 0 | 0 | 0 |
| | OFC 11 | 0 | 0 | 0 | 0 |
| | OFC 12 | 0 | 0 | 0 | 0 |
| | Emulsifier | 0.4 | 0.4 | 0.4 | 0.4 |
| Water phase | Water | 5 | 5 | 5 | 5 |
| | Egg yolk extract | 1 | 1 | 1 | 1 |
| | Dietary salt | 0.4 | 0.4 | 0.4 | 0.4 |
| Oil phase:water phase (mass ratio) | | 93.6:6.4 | 93.6:6.4 | 93.6:6.4 | 93.6:6.4 |
| Evaluation result | Kneading property | ◎ | ◎ | ◎ | ○ |
| | Creaming property | ◎ | ◎ | ◎ | ◎ |
| | Low temperature usability | ◎ | ◎ | ◎ | ○ |

OFC = Oil-and-Fat Composition
Ex. = Example

TABLE 5

Mixing composition of spread (unit: part by mass) and evaluation result of spread

| Spread | | Ex. 5 | Ex. 6 | Ex. 7 |
|---|---|---|---|---|
| Oil phase | OFC 2 | 71.8 | 0 | 0 |
| | OFC 3 | 0 | 71.8 | 0 |
| | OFC 4 | 0 | 0 | 71.8 |
| | OFC 7 | 0 | 0 | 0 |
| | OFC 8 | 0 | 0 | 0 |
| | OFC 9 | 0 | 0 | 0 |
| | OFC 10 | 0 | 0 | 0 |
| | OFC 11 | 0 | 0 | 0 |
| | OFC 12 | 0 | 0 | 0 |
| | Emulsifier | 0.1 | 0.1 | 0.1 |
| | Perfume | 0.1 | 0.1 | 0.1 |
| | Lecithin | 0.5 | 0.5 | 0.5 |
| Water phase | Water | 27.2 | 27.2 | 27.2 |
| | Dietary salt | 1 | 1 | 1 |
| Oil phase:water phase (mass ratio) | | 72.5:28.2 | 72.5:28.2 | 72.5:28.2 |
| Evaluation result | Meltability in the mouth | ◎ | ◎ | ◎ |
| | Low temperature usability | ◎ | ◎ | ○ |

OFC = Oil-and-Fat Composition
Ex. = Example

TABLE 4

Mixing composition of margarine for kneading (unit: part by mass) and evaluation result of margarine for kneading

| Margarine for kneading | | Com. 1 | Com. 2 | Com. 3 | Com. 4 | Com. 5 | Com. 6 |
|---|---|---|---|---|---|---|---|
| Oil phase | OFC 1 | 0 | 0 | 0 | 0 | 0 | 0 |
| | OFC 2 | 0 | 0 | 0 | 0 | 0 | 0 |
| | OFC 3 | 0 | 0 | 0 | 0 | 0 | 0 |
| | OFC 4 | 0 | 0 | 0 | 0 | 0 | 0 |
| | OFC 7 | 93.2 | 0 | 0 | 0 | 0 | 0 |
| | OFC 8 | 0 | 93.2 | 0 | 0 | 0 | 0 |
| | OFC 9 | 0 | 0 | 93.2 | 0 | 0 | 0 |
| | OFC 10 | 0 | 0 | 0 | 93.2 | 0 | 0 |
| | OFC 11 | 0 | 0 | 0 | 0 | 93.2 | 0 |
| | OFC 12 | 0 | 0 | 0 | 0 | 0 | 93.2 |
| | Emulsifier | 0.4 | 0.4 | 0.4 | 0.4 | 0.4 | 0.4 |
| Water phase | Water | 5 | 5 | 5 | 5 | 5 | 5 |
| | Egg yolk extract | 1 | 1 | 1 | 1 | 1 | 1 |
| | Dietary salt | 0.4 | 0.4 | 0.4 | 0.4 | 0.4 | 0.4 |
| Oil phase:water phase (mass ratio) | | 93.6:6.4 | 93.6:6.4 | 93.6:6.4 | 93.6:6.4 | 93.6:6.4 | 93.6:6.4 |
| Evaluation result | Kneading property | Δ | Δ | X | X | X | X |
| | Creaming property | Δ | X | Δ | Δ | Δ | X |
| | Low temperature usability | Δ | ◎ | Δ | Δ | X | X |

OFC = Oil-and-Fat Composition
Com. = Comparative Example

TABLE 6

Mixing composition of spread (unit: part by mass) and evaluation result of spread

| | Spread | Com. 7 | Com. 8 | Com. 9 | Com. 10 | Com. 11 | Com. 12 |
|---|---|---|---|---|---|---|---|
| Oil phase | OFC 2 | 0 | 0 | 0 | 0 | 0 | 0 |
| | OFC 3 | 0 | 0 | 0 | 0 | 0 | 0 |
| | OFC 4 | 0 | 0 | 0 | 0 | 0 | 0 |
| | OFC 7 | 71.8 | 0 | 0 | 0 | 0 | 0 |
| | OFC 8 | 0 | 71.8 | 0 | 0 | 0 | 0 |
| | OFC 9 | 0 | 0 | 71.8 | 0 | 0 | 0 |
| | OFC 10 | 0 | 0 | 0 | 71.8 | 0 | 0 |
| | OFC 11 | 0 | 0 | 0 | 0 | 71.8 | 0 |
| | OFC 12 | 0 | 0 | 0 | 0 | 0 | 71.8 |
| | Emulsifier | 0.1 | 0.1 | 0.1 | 0.1 | 0.1 | 0.1 |
| | Perfume | 0.1 | 0.1 | 0.1 | 0.1 | 0.1 | 0.1 |
| | Lecithin | 0.5 | 0.5 | 0.5 | 0.5 | 0.5 | 0.5 |
| Water phase | Water | 27.2 | 27.2 | 27.2 | 27.2 | 27.2 | 27.2 |
| | Dietary salt | 1 | 1 | 1 | 1 | 1 | 1 |
| Oil phase:water phase (mass ratio) | | 72.5:28.2 | 72.5:28.2 | 72.5:28.2 | 72.5:28.2 | 72.5:28.2 | 72.5:28.2 |
| Evaluation result | Meltability in the mouth | X | X | Δ | X | ◎ | X |
| | Low temperature usability | ◎ | X | X | Δ | X | X |

OFC = Oil-and-Fat Composition
Com. = Comparative Example

TABLE 7

Mixing composition of coating cream (unit: part by mass) and evaluation result of coating cream

| Coating cream | Ex. 8 | Ex. 9 | Ex. 10 | Ex. 11 |
|---|---|---|---|---|
| OFC 3 | 45 | 0 | 0 | 0 |
| OFC 4 | 0 | 45 | 0 | 0 |
| OFC 5 | 0 | 0 | 45 | 0 |
| OFC 6 | 0 | 0 | 0 | 45 |
| OFC 7 | 0 | 0 | 0 | 0 |
| OFC 8 | 0 | 0 | 0 | 0 |
| OFC 9 | 0 | 0 | 0 | 0 |
| OFC 10 | 0 | 0 | 0 | 0 |
| OFC 11 | 0 | 0 | 0 | 0 |
| OFC 12 | 0 | 0 | 0 | 0 |
| Cheese powder | 20 | 20 | 20 | 20 |
| Powder sugar | 35 | 35 | 35 | 35 |
| Evaluation result — Solidification time | ○ | ○ | ◎ | ◎ |
| Evaluation result — Condition of cream | ○ | ○ | ○ | ○ |

OFC = Oil-and-Fat Composition
Ex. = Example

TABLE 8

Mixing composition of coating cream (unit: part by mass) and evaluation result of coating cream

| Coating cream | Com. 13 | Com. 14 | Com. 15 | Com. 16 | Com. 17 | Com. 18 |
|---|---|---|---|---|---|---|
| OFC 3 | 0 | 0 | 0 | 0 | 0 | 0 |
| OFC 4 | 0 | 0 | 0 | 0 | 0 | 0 |
| OFC 5 | 0 | 0 | 0 | 0 | 0 | 0 |
| OFC 6 | 0 | 0 | 0 | 0 | 0 | 0 |
| OFC 7 | 45 | 0 | 0 | 0 | 0 | 0 |
| OFC 8 | 0 | 45 | 0 | 0 | 0 | 0 |
| OFC 9 | 0 | 0 | 45 | 0 | 0 | 0 |
| OFC 10 | 0 | 0 | 0 | 45 | 0 | 0 |
| OFC 11 | 0 | 0 | 0 | 0 | 45 | 0 |
| OFC 12 | 0 | 0 | 0 | 0 | 0 | 45 |
| Cheese powder | 20 | 20 | 20 | 20 | 20 | 20 |
| Powder sugar | 35 | 35 | 35 | 35 | 35 | 35 |
| Evaluation result — Solidification time | Δ | Δ | X | Δ | X | X |
| Evaluation result — Condition of cream | Δ | Δ | Δ | X | X | X |

OFC = Oil-and-Fat Composition
Com. = Comparative Example

TABLE 9

Mixing composition of sand cream (unit: part by mass) and evaluation result of sand cream

| Sand cream | | Ex. 12 | Ex. 13 | Ex. 14 | Ex. 15 |
|---|---|---|---|---|---|
| OFC 3 | | 50 | 0 | 0 | 0 |
| OFC 4 | | 0 | 50 | 0 | 0 |
| OFC 5 | | 0 | 0 | 50 | 0 |
| OFC 6 | | 0 | 0 | 0 | 50 |
| OFC 7 | | 0 | 0 | 0 | 0 |
| OFC 8 | | 0 | 0 | 0 | 0 |
| OFC 9 | | 0 | 0 | 0 | 0 |
| OFC 10 | | 0 | 0 | 0 | 0 |
| OFC 11 | | 0 | 0 | 0 | 0 |
| OFC 12 | | 0 | 0 | 0 | 0 |
| Powder sugar | | 50 | 50 | 50 | 50 |
| Evaluation result | Binding property | ○ | ○ | ◎ | ◎ |
| | Formability | ◎ | ◎ | ◎ | ◎ |

OFC = Oil-and-Fat Composition
Ex. = Example

TABLE 10

Mixing composition of sand cream (unit: part by mass) and evaluation result of sand cream

| Sand cream | | Com. 19 | Com. 20 | Com. 21 | Com. 22 | Com. 23 | Com. 24 |
|---|---|---|---|---|---|---|---|
| OFC 3 | | 0 | 0 | 0 | 0 | 0 | 0 |
| OFC 4 | | 0 | 0 | 0 | 0 | 0 | 0 |
| OFC 5 | | 0 | 0 | 0 | 0 | 0 | 0 |
| OFC 6 | | 0 | 0 | 0 | 0 | 0 | 0 |
| OFC 7 | | 50 | 0 | 0 | 0 | 0 | 0 |
| OFC 8 | | 0 | 50 | 0 | 0 | 0 | 0 |
| OFC 9 | | 0 | 0 | 50 | 0 | 0 | 0 |
| OFC 10 | | 0 | 0 | 0 | 50 | 0 | 0 |
| OFC 11 | | 0 | 0 | 0 | 0 | 50 | 0 |
| OFC 12 | | 0 | 0 | 0 | 0 | 0 | 50 |
| Powder sugar | | 50 | 50 | 50 | 50 | 50 | 50 |
| Evaluation result | Binding property | Δ | X | X | X | X | X |
| | Formability | Δ | X | Δ | ○ | Δ | X |

OFC = Oil-and-Fat Composition
Com. = Comparative Example

TABLE 11

Mixing composition of spread (unit: part by mass) and evaluation result of spread

| | Spread | Ex. 16 | Ex. 17 |
|---|---|---|---|
| Oil phase | OFC 13 | 71.8 | 0 |
| | OFC 14 | 0 | 71.8 |
| | Emulsifier | 0.1 | 0.1 |
| | Perfume | 0.1 | 0.1 |
| | Lecithin | 0.5 | 0.5 |
| Water phase | Water | 27.2 | 27.2 |
| | Dietary salt | 1 | 1 |
| Oil phase:water phase (mass ratio) | | 72.5:28.2 | 72.5:28.2 |
| Evaluation result | Meltability in the mouth | ◎ | ◎ |
| | Low temperature usability | ○ | ○ |

OFC = Oil-and-Fat Composition
Ex. = Example

TABLE 12

Mixing composition of coating cream (unit: part by mass) and evaluation result of coating cream

| Coating cream | | Ex. 18 |
|---|---|---|
| OFC 15 | | 45 |
| Cheese powder | | 20 |
| Powder sugar | | 35 |
| Evaluation result | Solidification time | ◎ |
| | Condition of cream | ○ |

OFC = Oil-and-Fat Composition
Ex. = Example

What is claimed is:

1. An oil-and-fat composition, comprising oil-and-fats (A) and (B) shown below and meeting requirements (a) and (b) shown below:

Oil-and-fat (A): an oil-and-fat comprising a saturated fatty acid having 12 to 14 carbon atoms in an amount of 20 to 70 mass % relative to a total amount of all of constituting fatty acids in the oil-and-fat (A);

Oil-and-fat (B): an oil-and-fat comprising palmitic acid in an amount of 20 to 69.5 mass %, stearic acid in an amount of 0.5 to 6 mass %, and oleic acid in an amount of 30 to 60 mass % all relative to a total amount of all of constituting fatty acids in the oil-and-fat (B);

Requirement (a): A content of P2O in said oil-and-fat composition, comprising oil-and-fats (A) and (B), is 12 to 45 mass % (the content of P2O : a total content of PPO and POP in all triacylglycerol; PPO: a triacylglycerol comprising palmitic acids as fatty acids of first and second positions or second and third positions, and oleic acid as a fatty acid of the third position or the first position; POP: a triacylglycerol comprising palmitic acids as fatty acids of first and third positions, and oleic acid as a fatty acid of a second position; "P": palmitic acid; and "O": oleic acid); and Requirement (b): A ratio of PPO to POP (PPO/POP) in said oil-and-fat composition, comprising oil-and-fats (A) and (B), is 0.15 to 1.00, wherein the oil-and-fat (B) is one or not less than two selected from the group consisting of an oil-and-fat obtained by palm olein comprising an iodine value of 50 to 65 is transesterified, palm mid-fraction comprising an iodine value of 43 to 48 and palm super olein comprising an iodine value of 55 to 70.

2. A plastic oil-and-fat composition using the oil-and-fat composition described in claim 1.

3. The plastic oil-and-fat composition described in claim 2, wherein the plastic oil-and-fat composition comprises a composition used for kneading, a spread, a coating cream, or a sand cream.

4. A food product using the plastic oil-and-fat composition described in claim 2.

5. An oil-and-fat composition, comprising oil-and-fats (A) and (B) shown below and meeting requirements (a) and (b) shown below:

Oil-and-fat (A): an oil-and-fat comprising a saturated fatty acid having 12 to 14 carbon atoms in an amount of 20 to 70 mass % relative to a total amount of all of constituting fatty acids in the oil-and-fat (A);

Oil-and-fat (B): an oil-and-fat comprising palmitic acid in an amount of 20 to 69.5 mass %, stearic acid in an amount of 0.5 to 6 mass %, and oleic acid in an amount of 30 to 60 mass % all relative to a total amount of all of constituting fatty acids in the oil-and-fat (B);

Requirement (a): A content of P2O in said oil-and-fat composition, comprising oil-and-fats (A) and (B), is 12 to 45 mass % (the content of P2O: a total content of PPO and POP in all triacylglycerol; PPO: a triacylglycerol comprising palmitic acids as fatty acids of first and second positions or second and third positions, and oleic acid as a fatty acid of the third position or the first position; POP: a triacylglycerol comprising palmitic acids as fatty acids of first and third positions, and oleic acid as a fatty acid of a second position; "P": palmitic acid; and "O": oleic acid); and Requirement (b): A ratio of PPO to POP (PPO/POP) in said oil-and-fat composition, comprising oil-and-fats (A) and (B), is 0.15 to 1.00, wherein the oil-and-fat (A) is one or not less than two selected from the group consisting of a transesterified oil (A) shown below and an oil-and-fat comprising a saturated fatty acid having 12 to 14 carbon atoms in an amount of 50 to 70 mass % relative to the total amount of all of the constituting fatty acids in the oil-and-fat:

Transesterified oil (A): an oil-and-fat comprising a saturated fatty acid having 12 to 14 carbon atoms in an amount of 20 to 60 mass % and a saturated fatty acid having 16 to 18 carbon atoms in an amount of 40 to 80 mass % all relative to the total amount of all of the constituting fatty acids in the transesterified oil (A), and being obtained by that a transesterification is carried out.

* * * * *